United States Patent [19]

Suszynski et al.

[11] Patent Number: 5,018,872
[45] Date of Patent: May 28, 1991

[54] PROBE ASSEMBLY FOR INFRARED THERMOMETER

[75] Inventors: Edward D. Suszynski, Vista; Kerry Banke, La Mesa; Thomas K. Gregory, Carlsbad, all of Calif.

[73] Assignee: Diatek, Inc., San Diego, Calif.

[21] Appl. No.: 417,267

[22] Filed: Oct. 5, 1989

Related U.S. Application Data

[63] Continuation-in-part of Ser. No. 265,881, Nov. 1, 1988, abandoned.

[51] Int. Cl.$^5$ .............. G01J 5/06; G01J 5/12; G01K 1/08; G01K 7/02
[52] U.S. Cl. .................... 374/133; 128/664; 128/736; 374/121; 374/208; 374/209; 374/158
[58] Field of Search .......... 374/2, 120, 121, 129, 374/130, 131, 132, 133, 170, 182, 158, 208, 209; 250/352; 356/43; 340/584, 600; 128/664, 736; 206/306

[56] References Cited

U.S. PATENT DOCUMENTS

| | | |
|---|---|---|
| 2,562,538 | 7/1951 | Dyer ............................. 374/132 |
| 2,661,454 | 12/1953 | Wannamaker, Jr. et al. ...... 374/133 |
| 2,696,117 | 12/1954 | Harrison ........................ 374/133 |
| 2,811,856 | 11/1957 | Harrison ........................ 374/132 |
| 3,277,715 | 10/1966 | Vanderschmidt ................ 374/132 |
| 3,368,076 | 2/1968 | Clifford ......................... 374/121 |
| 3,444,739 | 5/1969 | Treharne ........................ 374/133 |
| 3,746,873 | 7/1973 | Williams ........................ 250/352 |
| 3,878,836 | 4/1975 | Twentier ........................ 374/121 |
| 3,942,891 | 3/1976 | Spielberger et al. ............. 356/43 |
| 4,005,605 | 2/1977 | Michael ......................... 374/129 |
| 4,527,896 | 7/1985 | Irani et al. ..................... 374/133 |
| 4,553,852 | 11/1985 | Derderian et al. ............... 374/30 |
| 4,558,342 | 12/1985 | Sclar ............................. 250/338.4 |
| 4,602,642 | 7/1986 | O'Hara et al. .................. 374/170 |
| 4,634,294 | 1/1987 | Christol et al. .................. 374/130 |
| 4,722,612 | 2/1988 | Junkert et al. .................. 374/133 |
| 4,779,994 | 10/1988 | Diller et al. .................... 374/29 |
| 4,784,149 | 11/1988 | Berman et al. .................. 128/664 |
| 4,797,840 | 1/1989 | Fraden .......................... 374/133 |

FOREIGN PATENT DOCUMENTS 0044791 1/1982 European Pat. Off. .......... 374/132
1914468 11/1970 Fed. Rep. of Germany ...... 374/121

Primary Examiner—William A. Cuchlinski, Jr.
Assistant Examiner—Diego F. F. Gutierrez
Attorney, Agent, or Firm—Pretty, Schroeder, Brueggemann & Clark

[57] ABSTRACT

A probe assembly for an infrared medical thermometer, which is adapted for insertion into a patient's ear canal and which facilitates a rapid measurement of the patient's body temperature with very high accuracy. The probe assembly includes a plastic outer tube sized to fit snugly in the patient's ear canal, with an elongated heat sink and an infrared sensor located within the tube. A cylindrical shield and inwardly-projecting guard ring ensure that the sensor's hot junction receives radiation only from the ear canal and that the sensor's cold junction is prevented from being heated for at least sufficient time to allow the thermometer to provide an accurate measurement of the patient's body temperature.

19 Claims, 2 Drawing Sheets

PROBE ASSEMBLY FOR INFRARED THERMOMETER

CROSS-REFERENCE TO A RELATED APPLICATION

This is a continuation-in-part of application Ser. No. 07/265,881, filed Nov. 1, 1988, and now abandoned.

BACKGROUND OF THE INVENTION

This invention relates generally to infrared medical thermometers and, more particularly, to infrared medical thermometers of a kind having an elongated probe adapted for insertion into a patient's ear canal.

Medical or clinical thermometers of this particular kind show great promise as an effective means for accurately measuring patient temperatures very rapidly, typically within several seconds. The inner ear is known to have a temperature very near to that of the body's core temperature, and infrared radiation transmitted from the eardrum and immediately surrounding tissue can therefore be a good indicator of the patient's body temperature. In addition, the thermometers provide minimal inconvenience and discomfort to the patients.

Infrared medical thermometers of this kind include an infrared radiation sensor having a hot junction exposed to the patient's ear canal and a cold junction maintained at a fixed, or at least known, temperature. The sensor generates a signal proportional to the temperature difference between the hot and cold junctions, whereby the patient's body temperature can be accurately ascertained.

One difficult problem that has been encountered in infrared thermometers of this kind is the maintenance of the infrared sensor's cold junction at a fixed or known temperature. Particularly troublesome in some situations is the prevention of heat from traveling from the ear canal to the cold junction.

It should, therefore, be appreciated that there is a need for an effective probe configuration for an infrared medical thermometer that effectively insulates the cold junction of its infrared sensor and prevents heat from the ear canal or other source from reaching that cold junction. The present invention fulfills that need.

SUMMARY OF THE INVENTION

The present invention is embodied in a medical thermometer having an infrared radiation sensor located within an elongated probe sized to fit snugly in the opening of a patient's ear canal, the probe being configured such that the sensor's hot junction is exposed to infrared radiation received along the ear canal yet the sensor's cold junction is substantially insulated from heat sources, particularly the ear canal, itself. More particularly, the thermometer of the invention includes an elongated, thin-walled outer tube having an open remote end sized to fit snugly in the opening of the patient's ear canal, and an elongated metallic sink located within, and coaxial with, the outer tube. The infrared sensor is secured to an end of the heat sink, with its hot junction exposed through the tube's open forward end and its cold junction shielded from the forward end. A cylindrical metallic shield encircles the infrared sensor, and an inwardly-projecting guard ring at the shield's forward end encircles the sensor's hot junction, to ensure that the only infrared radiation impinging on the sensor is received from the patient's ear canal. The outer tube, heat sink, and cylindrical shield are sized to define a first annular cavity between the tube and the cylindrical shield and a second annular cavity between the cylindrical shield and the infrared sensor. This effectively prevents heat received from the patient's ear canal from reaching the sensor's cold junction for sufficient time to enable the sensor's signal to be suitably processed to accurately ascertain the patient's body temperature.

In one more detailed feature of the invention, the guard ring defines a substantially circular aperture located immediately in front of the infrared sensor's hot junction, and the guard ring includes a concave, frustoconical surface diverging away from that aperture. The frusto-conical surface preferably makes an angle of about sixty-degrees relative to the outer tube's longitudinal axis such that nearly all infrared radiation incident on this surface is reflected away from the infrared sensor and such that infrared radiation received from a highly oblique angle can still be received and detected.

The cylindrical shield and guard ring are preferably formed of a metallic material, whereby heat can be rapidly conducted away from the location of the infrared sensor to the heat sink. The outer tube can be formed of a plastic, substantially non-heat-conductive material, and it preferably has an outer surface with a roughened texture such that small air pockets are formed between that surface and the plastic film of a protective cover that can be selectively placed over the probe. These small air pockets further insulate the infrared sensor from the patient's ear canal.

Other features and advantages of the present invention should become apparent from the following description of the preferred embodiment, taken in conjunction with accompanying drawings, which illustrate, by way of example, the principles of the invention.

DESCRIPTION OF THE PREFERRED EMBODIMENT

Figure 1:
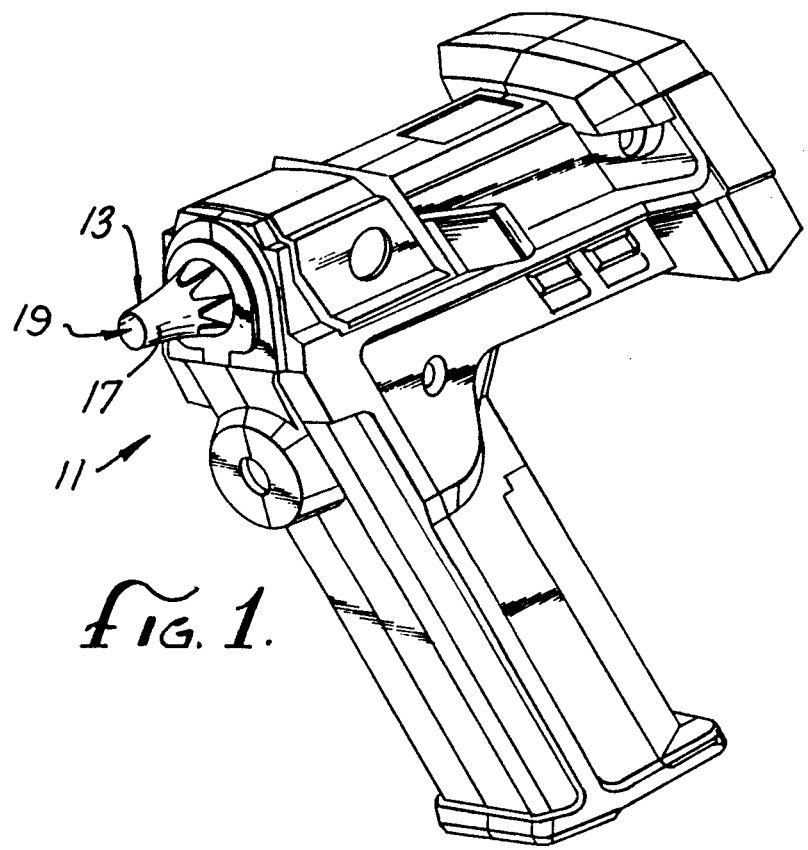
FIG. 1 is a perspective view of a hand-held infrared medical thermometer having an elongated probe configured in accordance with the preferred embodiment of the invention.
Figure 2:
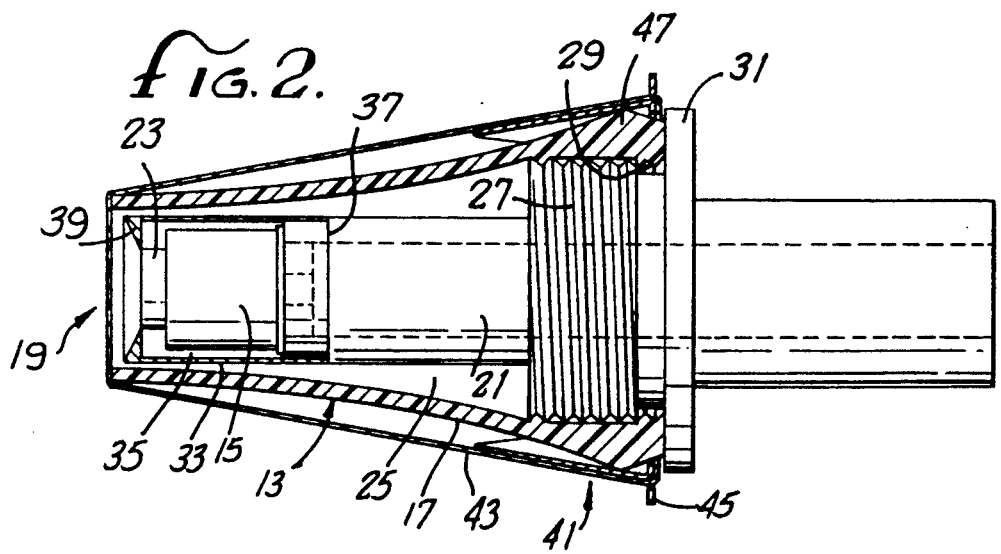
FIG. 2 is a cross-sectional view of the probe portion of the thermometer of FIG. 1.
Figure 3:
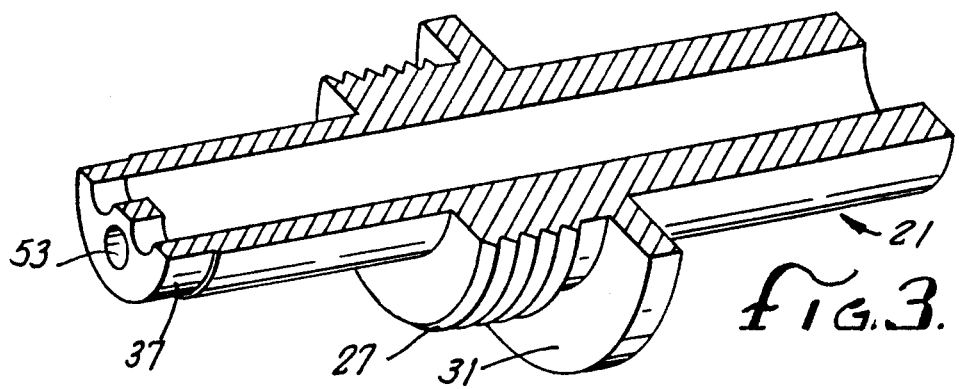
FIG. 3 is an enlarged perspective view, in section, of the elongated heat sink included in the thermometer probe of FIGS. 1 and 2.

With reference now t the drawings, and particularly to FIGS. 1-3, there is shown a hand-held infrared medical thermometer 11 having an elongated probe 13 adapted for insertion into the outer portion of a patient's ear canal, to measure the patient's body temperature. An infrared radiation sensor 15 located within the elongated probe, adjacent to the probe's forward end, receives infrared radiation transmitted along the ear canal and generates a corresponding electrical signal that can be suitably processed to rapidly determine the patient's body temperature.

The outer surface of the thermometer probe 13 is defined by an elongated, thin-walled plastic tube 17 with an open forward end 19 sized to fit snugly in the outer portion of the patient's ear canal. The probe need not project into the ear canal; rather, it is desired only that the probe's remote end press against the ear such that the only infrared radiation entering the plastic tube's open forward end comes from the ear canal.

Located within the elongated plastic tube 17 is an elongated metallic heat sink 21 that supports the infrared sensor 15 in a central position adjacent to the tube's open forward end 19. The infrared sensor is carried within a conventional metal can thermally bonded directly to one end of the heat sink. The sensor includes an outwardly-facing hot junction that is exposed through the tube's open forward end and an inwardly-facing cold junction that is shielded from the forward end. An infrared-transparent window 23 overlays the sensor's hot junction.

If the infrared sensor 15 initially has a substantially uniform temperature throughout, infrared radiation incident on the hot junction from an adjacent target will cause an electrical signal to be generated that represents the temperature difference between the sensor and the target. An important design feature of infrared thermometers of this kind is the determination of the target temperature before the sensor's proximity to the target can affect the temperature of the sensor's cold junction.

In accordance with the invention, the elongated outer tube 17 is secured to the elongated heat sink 21 at the tube's base end such that a narrow annular cavity 25 is defined between the tube and the heat sink and between the tube and the infrared sensor 15. This significantly impedes the transfer of heat from the patient's ear canal to the infrared sensor's cold junction. Such heat must travel axially along the plastic tube to reach the heat sink, where because of the heat sink's large heat capacity only minimal effect on the heat sink's temperature occurs. The elongated heat sink has a generally cylindrical shape, with male threads 27 near it; midpoint for threaded engagement with corresponding female threads 29 at the base end of the plastic tube 17. An annular flange 31 located rearwardly of the heat sink threads 27 functions as a base for limiting further threading of the plastic tube.

Figure 4:
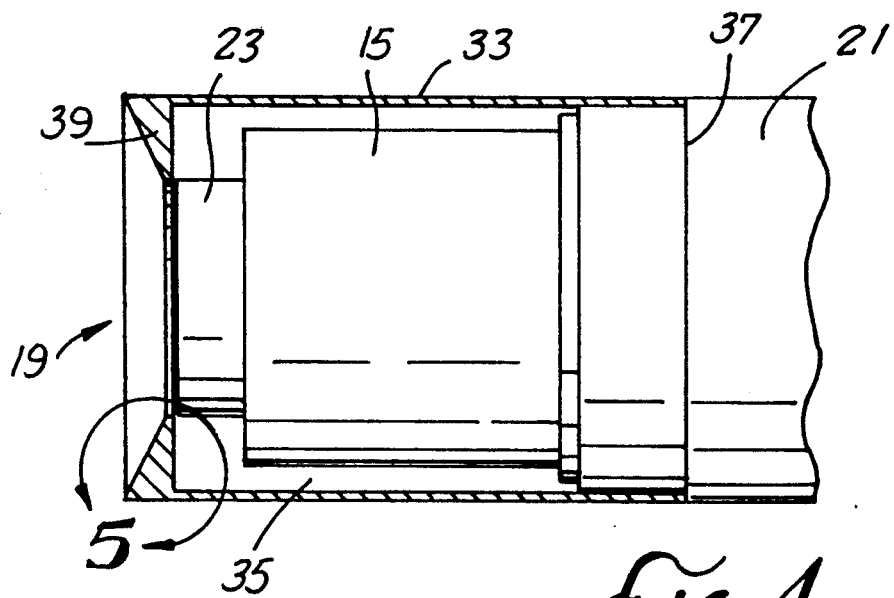
FIG. 4 is an enlarged side sectional view of a portion of the cylindrical shield, guard ring, infrared sensor, and transparent window of the thermometer probe of FIG. 2.
Figure 5:
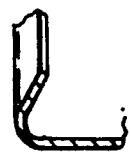
FIG. 5 is an enlarged side sectional view of an alternative guard ring to that depicted in FIG. 4, which is formed by bending the forward end of the cylindrical shield radially inwardly.

In another feature of the invention, depicted in FIGS. 2 and 4, the thermometer further includes a metallic cylindrical shield 33 projecting forwardly from the end of the heat sink 21, to encircle the infrared sensor 15. A second narrow annular cavity 35 is thereby defined between the cylindrical shield and the infrared sensor. Any heat that reaches the shield by radiation or convection from the plastic outer tube 17 is rapidly conducted rearwardly to the heat sink, where it has only a minimal effect on the heat sink's temperature. The cylindrical shield is preferably formed of a highly heat-conductive metal such as copper. The infrared sensor's cold junction temperature is thereby further prevented from being raised by a proximity of the probe to the patient's ear canal. The base end of the cylindrical shield fits snugly over a reduced-diameter section 37 at the forward end of the heat sink.

Projecting radially inwardly from the cylindrical shield's forward end is a flange or guard ring 39 that defines an aperture aligned with the window 23 overlying the infrared sensor's hot junction. This prevents infrared radiation received from the patient's ear canal from reaching the infrared sensor's cold junction. The outwardly-facing surface of the guard ring is concave and frusto-conical, with the frusto-conical angle selected so as not to obstruct the sensor's field of view, e.g., about 30 degrees relative to the surface of the hot junction or about 60 degrees relative to the probe's longitudinal axis. In addition, the guard ring's frusto-conical surface is highly reflective, such that nearly all incident radiation impinging on it from the patient's ear canal is reflected away. The small proportion of incident radiation that is absorbed by the surface is conducted rearwardly along the cylindrical shield 33 to the heat sink 21.

To the extent that the outer plastic tube 17 receives heat (by conduction, convection and radiation) from the patient's ear canal, that heat is isolated from the infrared sensor 15 by the first narrow annular cavity 25 and the second narrow annular cavity 35. Whatever portion of this heat that is transferred across the first annular cavity (via convection and radiation), from the outer tube 17 to the cylindrical shield 33, is rapidly conducted rearwardly to the heat sink 21. The amount of this transferred heat is minimized by polishing and gold plating the outer surfaces of the cylindrical shield and the forward portion of the heat sink, so as to be highly reflective of incident radiation. The inwardly-facing surfaces of the cylindrical shield and the guard ring 39 also are preferably polished and gold plated, so as to be poor radiators and thereby minimize the amount of radiation directed at the sensor's cold junction. The sensor's cold junction thereby is maintained at a substantially constant temperature, at least for sufficient time (e.g., several seconds) for the thermometer 11 to appropriately process the infrared sensor's signal and determine the patient's body temperature.

The thermometer 11 of the invention is ordinarily expected to be used to measure the body temperatures of multiple patients. For proper hygiene, and to prevent cross-contamination from occurring, a disposable protective probe cover 41 (FIG. 2) is therefore used for each patient. One suitable probe cover is described in detail in copending and commonly-assigned U.S. patent application, Ser. No. 07/265,525, filed Nov. 1, 1988 and entitled "Disposable Probe Cover Assembly for Medical Thermometer." The probe cover includes a plastic film 43 that can be stretched over the probe's outer plastic tube 17, with an encircling substrate or carrier 45 adapted to be releasably secured to an enlargement 47 at the probe's rearward end. The stretchable film is preferably formed of a linear, low-density polyethylene material, which is substantially transparent to infrared radiation, but which is sufficiently resilient and tough to avoid being punctured or otherwise damaged during normal use.

The stretchable plastic film 43 of the protective probe cover 41 stretches straight across the forward end 19 of the outer plastic tube 17. In this position, the film is spaced sufficiently in front of the infrared sensor's hot junction that the possibility of its contacting with the hot junction is minimized. Such contact is undesired, because it could lead to an undesired conduction of heat directly to the sensor 15.

Figure 6:
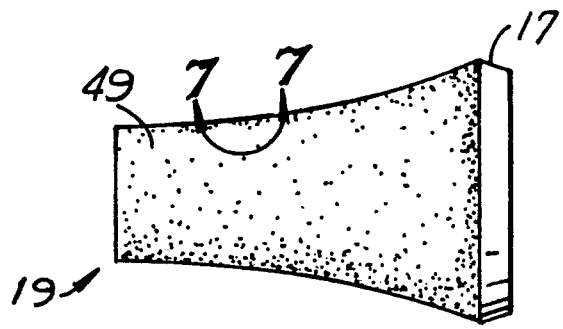
FIG. 6 is an enlarged side view of the outer surface of the probe, showing its roughened texture.
Figure 7:
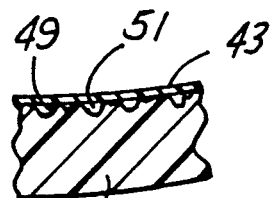
FIG. 7 is a further enlarged fragmentary sectional view of a portion of the probe indicated by the arrows 7—7 in FIG. 6, the view showing the small air pockets located between the probe's outer surface and the encircling plastic film.

With reference now to FIGS. 6 and 7, a further structural feature for minimizing the transfer of heat from the patient's ear canal to the infrared sensor 15 will be described. In particular, the outer surface of the plastic outer tube 17 has a roughened texture, as indicated by the reference numeral 49, such that when the plastic film 43 of the protective cover 41 is placed over the tube, it will contact only the high points of the surface. Small air pockets 51 are thereby formed between the film and the surface, which further minimizes the undesired transfer of heat to the tube. This roughened surface can be formed using any of a number of conventional techniques and the texture can be either random (e.g., sandblasted) or regular (e.g., longitudinally ribbed).

As shown in FIG. 3, the heat sink 21 is hollow, with several holes 53 at its end, for carrying a corresponding number of wires that connect to the infrared sensor 15. These wires carry the signal representative of the detected temperature, for processing by suitable electronics located elsewhere within the thermometer housing. Those of ordinary skill in the art will appreciate that numerous conventional techniques can be utilized for such processing and for calibrating the thermometer prior to each use.

It should be appreciated from the foregoing description that the present invention provides an effective probe configuration for an infrared medical thermometer adapted for insertion into a patient's ear canal, which facilitates a rapid measurement of the patient's body temperature with very high accuracy. An infrared sensor is located within an elongated plastic tube, with its hot junction facing outwardly through the tube's open forward end and with its cold junction in proximity to a heat sink. The probe configuration effectively limits the transfer of heat from the ear canal to the infrared sensor's cold junction for at least sufficient time to allow the thermometer to provide an accurate measurement of the patient's body temperature.

Although the present invention has been described in detail with reference only to the preferred embodiment, those of ordinary skill in the art will appreciate that various modifications can be made without departing from the invention. Accordingly, the invention is defined only by the following claims.

We claim:

1. An infrared medical thermometer for measuring a patient's body temperature by sensing infrared radiation transmitted along the patient's ear canal, the thermometer comprising:
   an elongated, thin-walled outer tube having an open forward end sized to fit snugly in the opening of a patient's ear canal;
   an elongated heat sink located within the tube and having a forward end;
   a sensor container secured to the forward end of the heat sink and positioned within the tube, adjacent to the tube's forward end;
   an infrared sensor located within the sensor container and including a hot junction facing the tube's forward end and a cold junction facing the heat sink; and
   heat-conductive shield means secured to the forward end of the heat sink, the shield means including a cylindrical shield encircling the infrared sensor container;
   wherein the tube, heat sink, and cylindrical shield are sized to define an outer annular cavity between the tube and the cylindrical shield, and wherein the cylindrical shield, heat sink, and sensor container are sized to define an inner annular cavity between the cylindrical shield and the sensor container, the outer and inner annular cavities being concentric with each other and cooperating to prevent heat received from the patient's ear canal from reaching the cold junction of the infrared sensor for sufficient time to enable the patient's body temperature to be accurately measured.

2. An infrared medical thermometer as defined in claim 1, wherein the shield means further includes an inwardly-projecting guard ring defining a substantially circular aperture aligned with the infrared sensor's hot junction, the guard ring including a concave, frusto-conical surface encircling the aperture.

3. An infrared medical thermometer as defined in claim 2, wherein the frusto-conical surface of the guard ring makes an angle of about 60 degrees with the longitudinal axis of the tube.

4. An infrared medical thermometer as defined in claim 1, wherein:
   the tube, the heat sink, and the sensor container are configured such that the only heat conduction path from the tube to the infrared sensor is through the heat sink; and
   the shield means, the heat sink, and the sensor container are configured such that the only heat conduction path from the shield means to the infrared sensor is through the heat sink.

5. An infrared sensor as defined in claim 2, wherein the outer surface of the cylindrical shield and the frusto-conical surface of the guard ring are constructed so as to be highly reflective of heat radiated to it from the encircling tube.

6. An infrared medical thermometer as defined in claim 1, wherein:
   the tube is formed of a plastic, low heat-conductive material; and
   the heat sink and the shield means are formed of a metallic, highly heat-conductive material.

7. An infrared medical thermometer as defined in claim 1, wherein:
   the thermometer is adapted for use with a protective cover that includes a plastic film adapted to be wrapped around the tube; and
   the tube includes an outer surface having a roughened texture such that small air pockets are formed between the outer surface and the plastic film of the protective cover, thereby further heat-insulating the cold junction of the infrared sensor from the patient's ear canal.

8. An infrared medical thermometer as defined in claim 1, wherein:
   the thermometer is adapted for use with a protective cover that includes a plastic film adapted to be wrapped around the tube; and
   the infrared sensor is located within the tube such that the hot junction of the sensor is spaced rearwardly of the plastic film.

9. An infrared medical thermometer as defined in claim 1, wherein the sensor container includes a metallic can thermally bonded to the forward end of the heat sink.

10. An infrared medical thermometer for measuring a patient's body temperature by sensing infrared radiation transmitted along the patient's ear canal, the thermometer comprising:

an elongated, thin-walled tube having a generally cylindrical outer surface with a roughened texture and further having an open forward end sized to fit snugly in the opening of a patient's ear canal;

an infrared sensor located within the tube, adjacent to the tube's forward end, the sensor including a hot junction facing the tube's forward end and a cold junction facing away from the tube's forward end;

wherein the thermometer is configured to prevent heat received from the patient's ear canal from reaching the cold junction of the infrared sensor for sufficient time to enable the patient's body temperature to be accurately measured; and a protective cover that includes a plastic film adapted to be wrapped around the tube, wherein small air pockets are formed between the roughened outer surface of the tube and the plastic film of the protective cover, thereby heat-insulating the cold junction of the infrared sensor from the patient's ear canal.

11. An infrared medical thermometer as defined in claim 10, wherein:

the thermometer further includes an elongated heat sink located within the tube and having a forward end terminating short of the forward end of the tube, a sensor container located within the tube and secured to the forward end of the heat sink, the infrared sensor being located within the sensor container, and heat-conductive shield means secured to the forward end of the heat sink, the shield means including a cylindrical shield encircling the sensor container; and the tube, heat sink, and cylindrical shield are sized to define an outer annular cavity between the tube and the cylindrical shield, and the cylindrical shield, heat sink, and sensor container are sized to define an inner annular cavity between the cylindrical shield and the sensor container, the outer and inner annular cavities being concentric with each other and preventing heat received from the patient's ear canal from reaching the cold junction of the infrared sensor for sufficient time to enable the patient's body temperature to be accurately measured.

12. An infrared thermometer as defined in claim 11, wherein the shield means further includes an inwardly-projecting guard ring defining a substantially circular aperture aligned with the infrared sensor's hot junction, the guard ring including a concave, frusto-conical surface encircling the aperture.

13. An infrared medical thermometer as defined in claim 12, wherein the frusto-conical surface of the guard ring makes an angle of about 60 degrees with the longitudinal axis of the tube.

14. An infrared sensor as defined in claim 12, wherein the outer surface of the cylindrical shield and the frusto-conical surface of the guard ring are constructed so as to be highly reflective of heat radiated to it from the encircling tube.

15. An infrared medical thermometer as defined in claim 12, wherein:

the tube is formed of a plastic, low heat-conductive material; and the heat sink and the shield means are formed of a metallic, highly heat-conductive material.

16. An infrared medical thermometer as defined in claim 11, wherein the infrared sensor is located within the tube such that the hot junction of the sensor is spaced rearwardly of the plastic film.

17. An infrared medical thermometer as defined in claim 11, wherein:

the tube, the heat sink, and the sensor container are configured such that the only heat conduction path from the tube to the infrared sensor is through the heat sink; and the shield means, the heat sink, and the sensor container are configured such that the only heat conduction path from the shield means to the infrared sensor is through the heat sink.

18. An infrared medical thermometer as defined in claim 11, wherein the sensor container includes a metallic can thermally bonded to the forward end of the heat sink.

19. An infrared medical thermometer for measuring a patient's body temperature by sensing infrared radiation transmitted along the patient's ear canal, the thermometer comprising:

an elongated, thin-walled, plastic tube having a substantially cylindrical outer surface with a roughened texture and further having an open forward end sized to fit snugly in the opening of a patient's ear canal;

an elongated metallic heat sink located within the tube and having a forward end, wherein a first annular cavity is defined between the tube and the heat sink;

a sensor container secured to the forward end of the heat sink and positioned within the tube, adjacent to the tube's forward end;

an infrared sensor located within the sensor container and including a hot junction facing the tube's forward end and a cold junction facing the heat sink;

a heat-conductive cylindrical shield secured to the forward end of the heat sink and encircling the sensor container, wherein the first annular cavity is further defined between the tube and the cylindrical shield, and wherein a second annular cavity is defined between the cylindrical shield and the sensor container;

a guard ring projecting inwardly from the forward end of the cylindrical shield and defining a generally circular aperture aligned with the hot junction of the infrared sensor, the guard ring including a concave, frusto-conical surface facing the tube's forward end;

wherein the tube, heat sink, cylindrical shield, and guard ring cooperate to prevent heat received from the patient's ear canal from reaching the cold junction of the infrared sensor for sufficient time to enable the patient's body temperature to be accurately measured; and a protective cover that includes a plastic film adapted to cover the tube, wherein small air pockets are formed between the tube's outer surface and the plastic film of the protective cover, thereby further heat-insulating the infrared sensor from the patient's ear canal.

* * * * *